US006783063B2

(12) United States Patent
Holden

(10) Patent No.: US 6,783,063 B2
(45) Date of Patent: Aug. 31, 2004

(54) TECHNIQUE FOR ADDRESSING AND TRACKING IN A DELIVERY SYSTEM

(75) Inventor: William Holden, Durango, CO (US)

(73) Assignee: HoldenArt, Inc., Durango, CO (US)

( * ) Notice: Subject to any disclaimer, the term of this patent is extended or adjusted under 35 U.S.C. 154(b) by 0 days.

(21) Appl. No.: 10/119,325

(22) Filed: Apr. 9, 2002

(65) Prior Publication Data

US 2003/0189090 A1 Oct. 9, 2003

(51) Int. Cl.$^{7}$ .............................................. G06F 17/60
(52) U.S. Cl. .............................................. 235/379
(58) Field of Search ............... 235/375, 462.01–462.02, 235/385, 470, 485, 487, 494; 382/101, 175; 707/104.1; 713/179; 283/17, 72–74; 700/224–227, 221; 705/405–407

(56) References Cited

U.S. PATENT DOCUMENTS

| | | | | | |
|---|---|---|---|---|---|
| 4,743,747 | A | | 5/1988 | Fougere et al. | 235/494 |
| 5,420,403 | A | * | 5/1995 | Allum et al. | 235/375 |
| 5,617,481 | A | * | 4/1997 | Nakamura | 382/101 |
| 5,668,990 | A | | 9/1997 | Bajorinas et al. | 395/615 |
| 5,703,783 | A | | 12/1997 | Allen et al. | 364/478.01 |
| 5,770,841 | A | * | 6/1998 | Moed et al. | 235/375 |
| 5,835,604 | A | | 11/1998 | Lee | 380/51 |
| 5,869,819 | A | * | 2/1999 | Knowles et al. | 235/375 |
| 5,936,865 | A | | 8/1999 | Pintsov et al. | 364/478.14 |
| 5,953,427 | A | | 9/1999 | Cordery et al. | 380/51 |
| 5,974,147 | A | | 10/1999 | Cordery et al. | 380/25 |
| 5,974,402 | A | | 10/1999 | Lee et al. | 705/401 |
| 5,982,896 | A | | 11/1999 | Cordery et al. | 380/21 |
| 6,006,200 | A | * | 12/1999 | Boies et al. | 705/26 |
| 6,012,102 | A | * | 1/2000 | Shachar | 710/5 |
| 6,055,520 | A | * | 4/2000 | Heiden et al. | 705/410 |
| 6,108,643 | A | | 8/2000 | Sansone | 705/62 |
| 6,125,357 | A | | 9/2000 | Pintsov | 705/408 |
| 6,173,273 | B1 | | 1/2001 | Herbert | 705/62 |
| 6,175,827 | B1 | | 1/2001 | Cordery et al. | 705/410 |
| 6,208,980 | B1 | | 3/2001 | Kara | 705/408 |
| 6,216,947 | B1 | * | 4/2001 | Barna | 235/375 |
| 6,249,777 | B1 | | 6/2001 | Kara et al. | 705/404 |
| 6,275,745 | B1 | | 8/2001 | Critelli et al. | 700/227 |
| 6,338,434 | B1 | * | 1/2002 | Wilz et al. | 235/462.01 |
| 6,360,001 | B1 | * | 3/2002 | Berger et al. | 382/101 |
| 6,510,992 | B2 | * | 1/2003 | Wells et al. | 235/385 |
| 6,549,892 | B1 | * | 4/2003 | Sansone | 705/401 |
| 6,575,376 | B2 | * | 6/2003 | Yu | 235/494 |

* cited by examiner

*Primary Examiner*—Thien M. Le
*Assistant Examiner*—Edwyn Labaze
(74) *Attorney, Agent, or Firm*—Kent A. Lembke; Hogan & Hartson LLP

(57) ABSTRACT

Existing delivery systems, such as the U.S. Postal System, can be modified to operate more efficiently, and to maintain confidentiality regarding a specific address and/or recipient identity. A coded designation, preferably alphanumeric, is assigned to individual recipients. Destination data, as well as other data regarding the recipient is accessed from a database using the coded designation. Recipient information is kept within the system and is not exposed to those outside of it, thereby maintaining a high level of confidentiality and security for the recipient. Because full addresses do not have to be read or otherwise input into the system, the use of the short coded designation provides more reliable operation, as well as much faster operation of the routing and delivery system.

34 Claims, 1 Drawing Sheet

TECHNIQUE FOR ADDRESSING AND TRACKING IN A DELIVERY SYSTEM

FIELD OF THE INVENTION

The present invention is related in general to systems for addressing, distributing, and tracking items in a delivery system such as the U.S. Postal Service or private carriers. In particular, the present invention is directed to an addressing technique that provides privacy and security for the recipient, and facilitates tracking and delivery of items that have been addressed using the technique.

BACKGROUND OF ART

The U.S. Postal Service, and private delivery systems, as well as foreign postal services have been compelled to deal with overwhelming amounts of material to be delivered. In order to facilitate delivery, the material to be delivered must be properly addressed, and then tracked within the system to the final destination. One key requirement is that each item be properly and accurately addressed for the intended destination, and individual to receive the item. Tracking and delivery within any system require that the address on the item be easily recognizable so that it can be properly routed and tracked to its ultimate destination.

To facilitate this process, it is very common to translate the written or printed address on an item to be delivered into machine-readable form, such as a barcode. A number of systems for doing this are employed by both government and private carriers. Once such system is found in U.S. Pat. No. 4,743,747 to Fougere et al., incorporated herein by reference. In this system, an encrypted message based upon postage and mail address information is created. The encrypted message is used in the determination of authenticity. The encrypted message is placed in the address field of the item to be delivered so that authentication by an automatic, high-speed sorter can take place.

The most common system, used by the U.S. Postal Service, includes the use of barcodes so that high-speed sorters can very quickly read the address on a piece of mail. A system for generating a coded address list to facilitate the application of barcodes to pieces of mail is found in U.S. Pat. No. 5,668,990 to Bajorinas et al., incorporated herein by reference. The invention of this patent is directed to a method in apparatus for generating a coded address list. In this method, the address list is used to apply a predetermined address in the form of a barcode to a particular piece of mail based upon the written or printed address on that piece of mail. The system will print a legible alphanumeric address at the same time that it prints a barcode. The Bajorinas et al. system is meant to be integrated into the standard barcode sorting system of the U.S. Postal Service, to address a long-standing problem in this system. In particular, there are substantial problems due to the length and complexity of many addresses that have to be translated into barcode format so that the U.S. Postal Service mail sorting machines can operate properly.

To be acceptable for use, the barcode must meet strict specifications as to size, spacing of parallel bars, and the exact placement upon the envelope or package. Consequently, there is a substantial need for accurate addressing using printing systems that will print the barcode. Because of delivery requirements, and an occasional need for manual checking throughout the system, a legible (human readable) address must also be printed along with the barcode. However, this can lead to compromised security since the recipient's name and address are now available for general observation.

All postal systems throughout the world (as well as private carriers such as Federal Express, UPS, and the like) face the same problems, overwhelming amounts of items that must be delivered in a reasonable time frame, as well as the maintenance of confidentiality and security. To address these problems, more fully automated mail handling systems must be developed. In the past, the United States Postal Service addressed this through the use of the now-standard "Post net" barcode system, using five, nine, or eleven digits in machine-readable form. However, the limitations of this system have become apparent as the volume of mail handled by the U.S. Postal Service increases. There has been constant development to meet the challenges imposed by the ever-increasing volume of mail.

On such, improvement is found in U.S. Pat. No. 4,858,907, entitled A SYSTEM FOR FEEDING ENVELOPES FOR SIMULTANEOUS PRINTING OF ADDRESSES AND BARCODES, and Incorporated herein by reference. This patent discloses a system for printing envelopes with addresses, zip codes, and corresponding barcodes. This system is controlled by a computer, which includes software for converting zip codes into barcode form for printing on the material to be delivered.

Another system that is used to improve the efficiency of the U.S. Postal System is found in U.S. Pat. No. 5,326,181, entitled ENVELOPE ADDRESSING SYSTEM, ADAPTED TO SIMULTANEOUSLY PRINT ADDRESSES AND BARCODES, incorporated herein by reference. This patent teaches a method of addressing substrates with human-readable addresses containing a zip code and a barcode corresponding to the zip code. The method utilizes a computer, which controls a process whereby both a human-readable zip code and a machine-readable barcode are printed on a package to be delivered. A similar system is found in U.S. Pat. No. 5,377,120, entitled AN APPARATUS FOR COMMINGLING AND ADDRESSING MAIL PIECES. This patent is also incorporated herein by reference.

The systems and techniques described in the aforementioned patents are limited in that efficiency is hampered when an address list, against which the coding is compared, contains data that cannot be easily converted to a useable barcode. This problem is addressed in U.S. Pat. No. 5,668,990, entitled APPARATUS AND METHOD FOR GENERATING 100% UNITED STATES POSTAL SERVICE BARCODE LISTS, incorporated herein by reference. This patent describes a method and apparatus for generating a coded address list. The method is initiated by inputting an address list to a data processing device, which then reads each address record on the addressed list. As an address record is read, a set of rules is applied to the record to determine whether or not a corresponding barcode can be assigned. If a barcode can be assigned, then the data processing device writes the address record and its corresponding barcode to a first list. If, a corresponding barcode is not determined for a particular address record, the unmatched address record is posted to a second list. The second list can then be manually corrected by a system operator. By separating the two lists, packages which have addressed data on the first list can be processed far more quickly.

Unfortunately, the aforementioned system does not address privacy (confidentiality) or security considerations. Nor does the system address all the problems inherent to large numbers of improperly addressed or illegibly addressed items for delivery. These are simply segregated from those which are easily integrated into the system. Nor is the privacy (security) of the sender (if a proper return address is being used) a consideration with any existing system.

One reason that there are difficulties in integrating certain pieces of mail into various delivery systems is that addresses are often complex, thereby increasing the chances that a fill address will not be sufficiently legible for a barcode to be assigned to it. Mail that cannot be assigned a barcode due to an incomplete or illegible address still constitutes a major problem.

On the other hand, the presence of fully legible addresses and return addresses tends to negate any privacy (security) that either of the parties may wish to have since individuals outside of the delivery system can often view the address information before entry to the delivery system. Likewise, any individual within the delivery system can also obtain full name and address information on either the sender or the recipient, even if the individual has no clearances to receive sensitive information.

Accordingly, additional modifications to the U.S. Postal System mail encoding and handling operations as well as private delivery systems, are needed. In particular, such systems must be made faster, and able to automatically handle virtually all of the items passing there through so that less time is lost and a greater percentage of articles can be automatically handled. Further, such improvements should enhance the security of both the sender and the recipient while providing all necessary information only to those in the delivery system who are authorized to use it.

SUMMARY OF THE INVENTION

Accordingly, it is one goal or object of the present invention to overcome the drawbacks of the conventional art directed to the automated handling of items in a delivery system.

It is an additional goal of the present invention to expand the potential of existing delivery systems.

It is another object of the present invention to provide a system of universal address codes.

It is a further object of the present invention to provide address codes that are both machine-readable and human-readable.

It is an additional object of the present invention to provide a technique by which large amounts of personal information can be accessed based upon relatively short codes that can be used to address items for delivery.

It is again a further object of the present invention to provide a delivery system that provides safeguards against unauthorized access to address information for both the sender and the recipient of an item to be delivered.

It is stiff another object of the present invention to provide a delivery system in which a very short configuration of data can be used to address an item for delivery, while still providing access to comprehensive operators regarding address information for both sender and recipient.

It is yet an additional object of the present invention to provide a delivery technique in which a universal configuration of data can be used to provide complete address information for all possible senders and recipients interfacing with the delivery system.

It is again a further object of the present invention to provide an improved delivery technique that easily interfaces with existing delivery systems, such as the U.S. Postal System, Federal Express, UPS, and the like.

It is still another object of the present invention to provide a technique for addressing items in a delivery system that is far more reliable than existing addressing techniques, resulting in fewer items that cannot be handled automatically.

It is yet a further object of the present invention to provide a technique facilitating easy tracking of any particular, item through a delivery system.

It is again an additional object of the present invention to provide a technique to maximize both privacy and security in a delivery system.

It is still a further object of the present invention to provide a supplement to existing delivery systems in which additional recipient and sender data can be easily updated at the request of the relevant party.

It is again another object of the present invention to provide a technique for gradually modifying existing delivery systems where by such systems can achieve greater efficiency and user security.

It is yet a further goal to facilitate mail forwarding and address corrections, as well as other changes in address data.

These and other goals and objects of the present invention are achieved by a method of addressing an item for delivery to a destination. The method includes the steps of marking the item with a predesignated set of symbols associated with the destination. Afterwards, the predesignated sets of symbols are used to access a database to select address data associated with the destination.

Another aspect of the present invention includes a security system for routing an item for delivery. The system includes devices for inputting a predesignated set of symbols into the system, where the predesignated set of symbols is associated with the delivery destination of the item. The system also includes a database containing data specifying the destination or the item. This data is accessible by the use of the predetermined set of symbols.

DETAILED DESCRIPTION OF THE PREFERRED EMBODIMENTS

Figure 1:
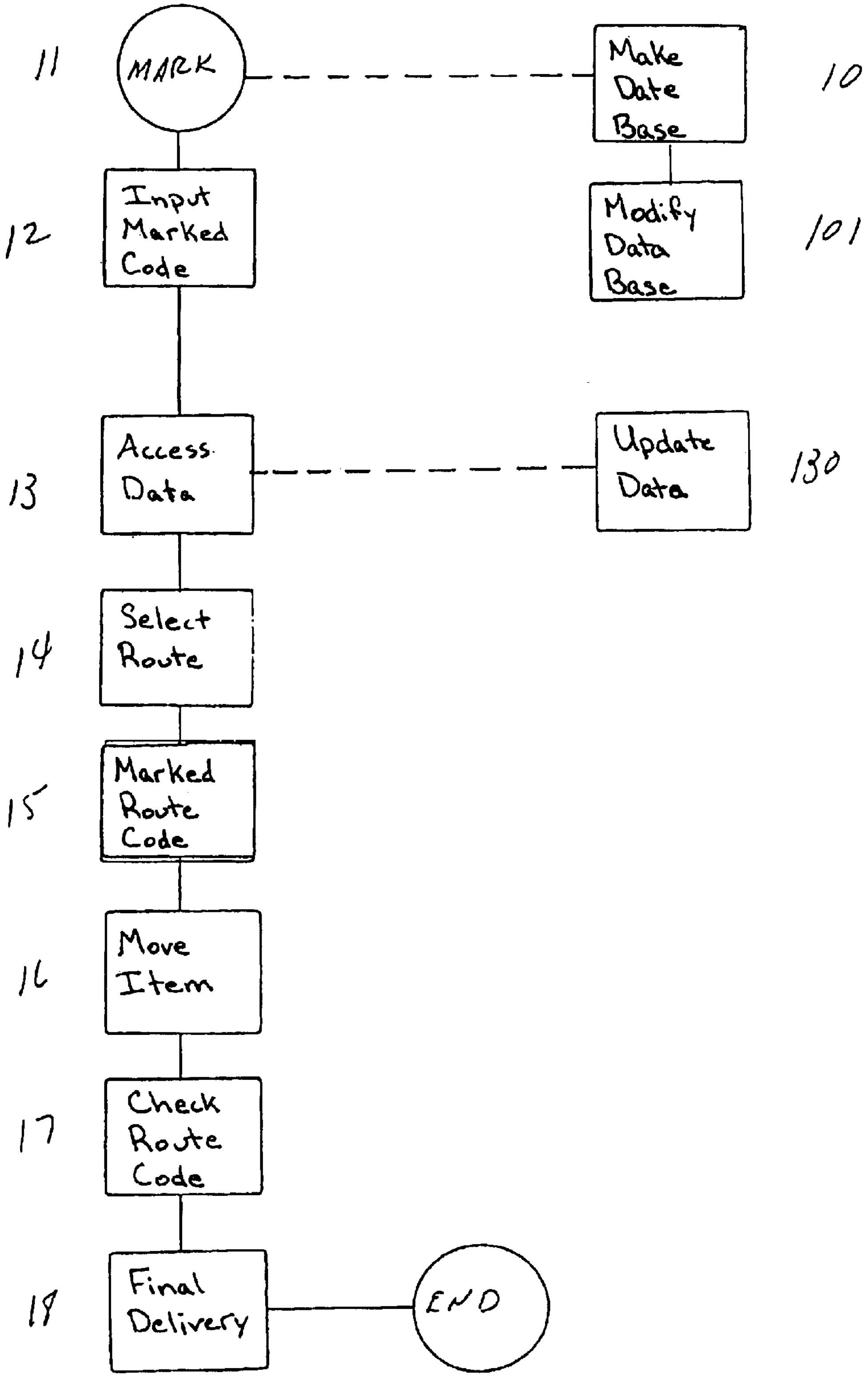
FIG. 1 is a flow diagram depicting the sequence of operation carried out in a delivery system employing the present invention.

A key aspect of the present invention is the use of a human-readable (and scannable) alphanumeric code (or code that can be generated from keyboard symbols) that is placed upon the item to be delivered. This code is referred to as a P-mail, and can be considered analagons analytics to an e-mail address. In one aspect of the present invention, an e-mail address can be used as the P-mail, operating as an access code for a database as described infra. The P-mail code is the only sender-provided address information that is needed for an item to be delivered in a system employing the present invention. All other necessary data is provided by a database accessed using the P-mail.

It should be noted that two P-mail numbers can be placed on an item to be delivered; one for the sender in the return address area, and one for the recipient in the destination address area of the item to be delivered. There is no need for the name of either party to be placed on the item. The inventive system operates to avoid a correlation between the name and address of a party on an item to be delivered.

Preferably the P-mail address encompasses only a single line for ease of both machine-scanning or human-reading. Also, a short P-mail address is much easier for the sending party to remember, and clearly place upon the item to be delivered. Besides convenience, another key attribute to the P-mail is that it not identify the true physical address of the recipient, outside of the delivery system. Further, a P-mail address can be configured so that the name of the recipient is not discernable therefrom, even within the system. As a result, an increased level of security is provided for the recipient. The same type of configuration can be applied to the return address of the sender, thereby protecting his or her identity as well as his or her specific address.

A key attribute of the P-mail is that it is highly flexible. For example, its configuration can be limited to an alphanumeric form that is particularly easy for scanners to read. In the alternative, it can be virtually any combination of alphanumeric characters and other keyboard generated symbols that a recipient, system user, or client may choose. As previously indicated, the recipient may choose to use his or her own e-mail address as a P-mail. Preferably, the P-mail system is focused primarily on individuals so that each individual in a particular delivery system will have his or her own P-mail. However, alternative systems, which focus on addresses or physical locations rather than individuals, can also be used. In such a case, a special suffix or prefix can be added to the P-mail configuration to indicate delivery to a specific individual at an address location as designated by the P-mail.

Since there are many types of delivery systems operating throughout the world, there is latitude for more than a single P-mail for a particular individual or location. For example, the U.S. Postal Service may have one P-mail for an individual while UPS or Federal Express may use other designations for the same individual or location. However, this range of flexibility is preferably limited to a single P-mail address for each individual, to be used by each delivery system. In one preferred embodiment, the United States Postal Service would designate a P-mail for each individual listed in the United States. Once the P-mail designations are assigned by the U.S. Postal Service, individuals could then insist that their P-mail designations be used by private carriers such as UPS, Federal Express, and the like. While this operation may somewhat limit the flexibility of the overall system, a universal P-mail system applied to each individual in the country would greatly facilitate all of the benefits of the present invention.

Additional flexibility and security can be achieved from the present invention through the use of special passwords, as either suffixes or prefixes to a standard P-mail configuration. The passwords would be selected by the recipient to be used with his or her P-mail only by certain designated individuals (senders) to whom the recipient would give the password. Deliveries attempted without the use of the password could then be halted before arrival at the address of the recipient. Such unwanted items could then be returned by the carrier, or placed in any number of different categories by the carrier. These categories could be for future pick up by the designated recipient, or additional investigation on behalf of the recipient, or even for intense security scrutiny. While this addition to the system might cause additional work and awkwardness, it could prove to be a very important factor, adding layers of security. Using the password technique, only those items which are expected and approved beforehand could be delivered. Without the designated password, all other items would be diverted for special processing. As previously indicated, such special processing could take the form of inspection, inquiry of the recipient, inquiry of the sender, or simple return to the sender. If the sender were to use only his or her P-mail, the same level of confidentiality would be applied to him or her as well. The sender could also designate a password as part of the normal P-mail configuration of the sender, for purposes of returning the item.

While the exact alphanumeric or symbolic form of the P-mail is not important, it is crucial that the P-mail designation be relatively short (no more than a single line) and easily scanned. Brevity and simplicity of the P-mail address are also very desirable so that a P-mail can easily be remembered by those using it. Standard keyboard symbols are preferred for ease of use.

For purposes of the present invention, the key aspect of the P-mail designation is as an access means to a designated portion of a database. For one preferred embodiment of the present invention, each P-mail will designate a different portion of a database. Each of which contains the physical address (as well as other data) associated with a P-mail designation.

Also included in the designated portion of the database would be the standard barcode associated with the physical address. As is well known, the U.S. Postal Service uses these barcodes for rapid scanning of each piece of mail to make certain that the correct routing is applied. Normally, the barcodes are generated based upon the full written address placed on each piece of mail. Unfortunately, these addresses are often not legible or are incorrect. As a result, a great deal of mail must be diverted for human review, or even returned to the sender. Very often, inadequately addressed mail is simply placed in the "dead letter" department.

This is avoided to a larger extent with the present invention since only a few characters or symbols have to be scanned (or entered into the system by a human operator) in order to access the correct address and a correct barcode designation for that address. A great deal of delay and inaccuracy is avoided using the present invention. The information for each P-mail configuration in the database does not have to be limited to that discussed above. The database can contain routing information, indicating, from point to point throughout the delivery system, where a particular item should be for expeditious delivery to its ultimate destination. Additional data indicators can be placed on the item along with the standard postal system barcode (as described in the previously-cited examples of conventional art), so that a quickly scanned indicator can be applied to each item so confirming that a particular item is in the correct location along the route to the item's final destination. Rather than reading the entire barcode and determining in a routing database if the item is at the correct location along the route, a designation of the correct location (placed on the item at the previous stopping point along the route) could be easily scanned to provide an instantaneous confirmation regarding the correct location along the route.

Such routing information could be transferred temporarily into the designated portion of the database associated with a particular P-mail in order to provide optimum routing data. Such use would provide additional justification for the expanded database of the present invention.

Additional information can also be provided regarding the handling of an item, or additional information regarding locating the final destination, and the placement of the item at that destination. For example, there could be specific instructions that an item is not to be placed in a mailbox but is to be left next to the front door on the front porch. Special instructions for the carrier (such as how to find a particular address, or where to place a particular item at that address) can be accessed for use by the mail carrier or delivery person. This information could be previously printed (at the last routing and handling terminal) and attached to the item, or it could be accessed using a portable computer so that the necessary information is displayed on a screen for the mail carrier, or delivery person.

For the necessary information associated with each P-mail designation to be available at each point of the system where it may be useful (especially for the final delivery operation by a carrier), it is necessary that the information can be accessed over a computer network from a wide variety of locations. The internet is ideal for this purpose. However, since there is secure information involved, and the U.S. Postal Service does not wish to make itself more vulnerable, it is most likely that an intra-net will be used. In such a system, only those individuals with specific access will be able to enter the system, which will be segregated from general public access. Mobile units would use only selected frequencies, constituting secure channels for communication with the computer network. Normally, such systems are "hard wired", with the computers connected to each other over dedicated data lines that are generally inaccessible to anyone outside the system. The drawback of this very secure arrangement is expense, and extended lead times are necessary for expanding the system.

In the alternative, communications for such a delivery system can be handled over the internet, using secure communications techniques and passwords. While this approach carries a higher level of risks, it is also less expensive, and the delivery system can expand as necessary without any hindrance. Further, the flexibility of the internet will allow any delivery system using the present invention to expand as necessary from an initial state that services only small numbers of P-mail clients.

The use of the internet also permits easy modifications to the data associated with each P-mail address. For example, each individual could access the system via the internet to modify his or her address information, or to add special instructions. The previously discussed delivery passwords could be changed as necessary. For situations where higher security would be required, the individual associated with a particular P-mail address would use the internet to place a request for modification to the database. Upon carrying out appropriate security measures, system personnel could then make the changes to the database without jeopardizing the integrity of the system. Easy modification of the database is important to facilitating timely and accurate mail-forwarding, as well as other time-sensitive changes in the delivery system.

The integrity of the present invention and its security features will be very important for the expanded use of the present invention. It should be noted that the e-mail address of the recipient can be contained within the database to be accessed by the P-mail address. In this manner, a recipient can be informed in advance, using the e-mail, that a particular package is about to be delivered to him. This is another advantage of the present system since it indicates when delivery is about to take place (so that the recipient might be ready for it), rather than just indicating when a shipment has been made, as is done with systems such as Amazon.com.

The present invention can be integrated with existing U.S. Postal Service databases and tracking systems. Instead of an entire physical address being properly read and processed, to generate the standard barcode, only the P-mail symbols have to be identified by the postal routing system. The simple P-mail designation can be used to access all other data, including the desired barcode designation, full address information, the presence of password requirements, and/or special handling requirements, as well as the name of the recipient. All of this information can be printed out on the item to be delivered, or (for greater security) placed only on a display screen at any particular time. The use of all of this data will be left to the discretion of the system operators for the purpose of expediting proper routing while maintaining an appropriate level of confidentiality and security. The system operators can also modify the data contained in each portion of the database that is associated with particular P-mail designation. It is expected that this will be done solely for the sake of expediting accurate routing through the delivery system, and maintaining security. In one variation of the present invention, system operators are used for inputting changes requested by clients having P-mail designations.

FIG. 1 is a flow diagram depicting a typical operating sequence for the present invention. At step 11, an item to be delivered by either the U.S. Postal Service or a private carrier is marked with the P-mail designation of the recipient. The item would then be delivered to the U.S. Postal Service or private carrier in one of a number of conventional manners. It should be noted that the name of the recipient need not be used, and the physical address of the recipient will certainly not be used. It should further be noted that a P-mail designation can be used as the return address for the sender. Accordingly, neither the names nor the addresses of either the sender or the recipient need be displayed to any but select delivery system operators. As previously discussed, the P-mail designations can be derived from any number of different sources, using any number of different configurations.

It is understood that for step 11 to take place, a previous step 10, of establishing the appropriate database, must have already been carried out. The P-mail database, as previously described, is accessed using the P-mail designation to obtain information on a location or individuals associated with that particular P-mail designation. The database can be established as a universal system by the U.S. Postal Service, or in more limited form by either the Postal Service or private carriers. Either the U.S. Postal Service or private carriers can begin to use the system of the present invention on an extremely limited or experimental basis by selecting a limited number of subscribers for whom the use of the present invention is conducive.

The database established a step 10 is crucial to the operation of the present invention, but need not be established as a new database. Rather, modifications to existing databases, such as the U.S. Postal Service barcode system, are easy ways to facilitate the use of the present invention in a practical manner. Those are skilled in the field of database generation, manipulation and the maintenance will recognize that existing databases such as the Postal Service barcode system can easily be modified to use the P-mail designations of the present invention.

Another aspect of the present invention is that the databases associated with each P-mail designation are expected to be modified in accordance with individual movement, changes in the delivery system, and the addition of new subscribers and clients. Those skilled in database management will recognize that existing databases such as that used by the U.S. Postal Service can easily be expanded within the existing framework to accommodate new users of the present invention.

At step 12, it is assumed that the item to be delivered has already reached a U.S. Postal Service sorting and handling terminal. The P-mail designation is preferably scanned into the computer system, which controls the distribution, sorting and delivery system which is handling the subject item. While scanning of the preferably alphanumeric P-mail designation is preferred because of speed and simplicity, other methods can be used to input this data into the system. For example, if the P-mail address cannot be accurately scanned into the system, a human operator can be used to interpret the written-P-mail indication to manually input the correct P-mail designation into the system. If a human operator is unable to interpret the written P-mail designation at this point, the item can be sent back to the sender, thereby simplifying the entire sorting and handling process.

Once the P-mail designation has been input into the system (at step 12), the computer system controlling the sorting and routing of items carries out a correlation of the P-mail designation to data that is associated with that particular P-mail designation. All of the necessary data is then accessed as indicated in step 13. The data that is necessary for correct routing of that particular item is accessed. However, other types of data can also be accessed. One of the more important aspects of correlating the P-mail designation to data in the database is the confirmation of any pending updates that would change crucial data, such as destination address or routing information, as indicated at step 130. The procedure for checking on updated information would be left to the discretion of the delivery system operator.

At step 14 the correct routing data is determined from the data associated with the P-mail designation, as well as any other necessary data that is derived from the rest of the sorting and routing system. The destination routing data that is compiled for a particular item to be sent to a certain address associated with a particular P-mail designation can be as simple or as complex as desired by the system operators. For example, a series of intermediate points in the routing system may be designated to bring the item to the point of final delivery. In the alternative, a wide variety of different routes and delivery schedules can be offered by the computer controlling this sorting and routing system. Any alternative delivery and handling information can be put in the base.

Once the routing data has been determined at step 14, any necessary routing marks can be made on the item being handled, as indicated at step 15. The most predominant example of such marking is the use of the standard U.S. Postal System barcode printed on letters and other items being sorted. The use of the barcode allows high speed reading of delivery or routing information on the item so that the item can be handled by high speed sorting and handling machinery.

The extent of the marking to be added to the item is a matter of system operator discretion. For example, the system operator need print no more than the standard U.S. Postal System barcode on a particular item. This will normally suffice for any amount of high speed sorting and handling. However, additional markings can be used. For example, the delivery address of the item can be printed on that item. The name of the recipient would not be included so that confidentiality would be maintained. If a check of the routing of a particular item is being conducted by a human operator, the ultimate address need not be printed on the item. Rather, the barcode can be read and the designation address displayed upon a screen in front of the operator. This can be correlated by a second reading of the P-mail address to determine if the two are consistent. This should suffice for any checks of the integrity of the system at any point along the delivery route.

Other kinds of marks can be added to the item at step 15. For example, the subsequent handling points along the route can be identified, and appropriate marks indicative of the sequence of handling points printed on the item. As a result, only a very brief check of the item would be necessary at subsequent handling points to determine that the item was on its proper route. A full reading of the barcode and evaluation as previously described would not be necessary.

At step 16, the item is moved along its designating route from one handling point to another. At each handling point a check is made (as indicated at step 17) that the item is moving along the correct route to its final destination. Normally the barcode would be read to determine if the correct route was being followed. As previously described, the barcode could be checked against the P-mail to determine for proper correlation between the two exists. However, there are alternatives in that some of the marks could be made indicative of the next handling point so that only those marks need be checked at any particular handling point to determine if the item was at the correct location. This would greatly simplify the operation of moving and checking (steps 16 and 17), that are repeated throughout the routing of the item to its final destination.

At step 18 arrangements are made for the final step for the delivery of the item to its ultimate destination. During this step, the item to be delivered is sorted into a sequence of other items to be delivered to approximate locations, such as a mail carrier's route. Each item for delivery is then put into a particular sequence correlated to the delivery sequence of the carrier's route. At this time, the destination address could be printed on the item (based upon the correlation of the barcode data and the P-mail designation).

In an additional alternative of the present invention, greater security for the recipient can be maintained by avoiding the printing of either the name or the address of the recipient on the item to be delivered. Instead, scanning the barcode or the P-mail designation can be used to display the correct address on a portable screen used by the mail carrier or delivery person. Portable scanners for both barcodes or alphanumeric designations are already well known, and so, need no further description for purposes of enabling this aspect of the present invention. At this point, the mail carrier could also use the scanner to determine if multiple P-mail designations were associated with any particular address so that some designation could be added to the item to better identify the recipient of the item. At such a point, the name of the recipient might be made available to the carrier who could mark or otherwise label the item appropriately. Also, the carrier could be made aware of any special handling instructions or other information relevant to the delivery of articles to a particular address or a particular recipient.

While a number of preferred embodiments have been described by way of example, the present invention is not limited thereto. Rather, the present invention should be interpreted as including any and all variations, modifications, adaptations, permutations, and additional embodiments that would occur to one skilled in this technology, once having been taught the present invention. Accordingly, the present invention should be construed to be limited only by the following claims.

I claim:

1. A method of addressing an item for delivery to an addressee at a destination, said method comprising:

(a) marking at a point of origin said item with a predesignated encoded set of symbols, wherein the predesignated encoded set of symbols is defined by the addressee and does not include a physical address of the addressee, wherein the marking of said item comprises placing on the item a second predesignated encoded set of symbols associated with a sender for use in determining a return address;

(b) using said predesignated encoded set of symbols to access a database to look up delivery information for the item related to the predesignated encoded set of symbols; and (c) using said second predesignated encoded set of symbols to access the database to look up delivery information for the sender related to the second predesignated encoded set of symbols.

2. The method of claim 1, further comprising marking the item for delivery with a machine readable code representing a portion of the delivery information, wherein the machine readable code excludes the physical address of the addressee in human readable form.

3. The method of claim 1, wherein said predesignated encoded set of symbols comprises alphanumeric characters.

4. The method of claim 3, wherein said predesignated encoded set of symbols further comprise keyboard characters.

5. The method of claim 4, wherein said predesignated encoded set of symbols comprise an e-mail address.

6. The method of claim 6, wherein said second predesignated encoded set of symbols is an e-mail address for said sender.

7. The method of claim 6, wherein said second predesignated encoded set of symbols is used to access address data associated with said sender from said database.

8. The method of claim 1, further comprising the step of:

(d) marking said item with a barcode representing data indicative of a route to be taken to reach said designation.

9. The method of claim 8, wherein said barcode is in use in a previously-existing delivery system.

10. The method of claim 9, wherein said database is in a previously-existing delivery system.

11. A security system for routing an item for delivery to an addressee at a variable physical destination, said system comprising:

(a) means for inputting a first predesignated encoded set of symbols, provided on said item at a point of origin, associated with said addressee and known to said addressee, said predesignated encoded set of symbols operating as an alternative to a physical address designation for the addressee and for inputting a second predesignated encoded set of symbols, provided on said item at a point of origin, associated with a sender for use in determining a return address operating as an alternative to a physical address designation for the sender; and, (b) a database containing first data specifying a current value of said variable physical destination, said first data being accessible by said predesignated encoded set of symbols;

(c) means for displaying said first data responsive to input of said predesignated encoded set of symbols; and (d) means for using the second predesignated encoded set of symbols to access the database to look up delivery information for the sender related to the second predesignated encoded set of symbols.

12. The system of claim 11, wherein said security system operates while maintaining confidentiality regarding said destination.

13. The security system of claim 12, wherein said predesignated encoded set of symbols is arranged on said item before inputting said predesignated encoded set of symbols into said security system.

14. The system of claim 11, further comprising:

(e) means for printing on said first coded data regarding said destination.

15. The system of claim 14, wherein said first coded data comprises a barcode.

16. The system of claim 15, wherein said barcode is used in a previously existing delivery system.

17. The system of claim 14, further comprising:

(f) means for transporting said item along a route to said destination, said route comprising at least one distribution point; and, (g) means for using said first coded data to confirm a proper route of travel at said at least one distribution point.

18. The system of claim 17, further comprising:

(h) means for displaying said destination responsive to scanning said first coded data.

19. A method for delivering physical items to recipients at physical addresses, comprising:

storing a plurality of delivery records in memory corresponding to the recipients, each of the delivery records comprising a mail designation and a physical delivery address, the mail designation excluding the physical delivery address of each of the recipients and wherein the mail designation excludes a name corresponding to the recipient;

from an external location, receiving a physical item for delivery having one of the mail designations printed on an exterior surface;

using the mail designation on the received item to access the delivery records to identify the record associated with one of the recipients and to determine one of the physical delivery addresses associated with the mail designation for the one recipient;

marking the received item with an indicator of the determined physical delivery address, the indicator excluding the name corresponding to the recipient; and delivering the received item based on the indicator;

wherein the storing comprises receiving from the recipients the mail designations to be stored in the delivery records, whereby the recipients are able to select the mail designations.

20. The method of claim 19, wherein the indicator comprises a machine readable barcode.

21. The method of claim 19, wherein the indicator comprises a set of alphanumeric characters in human readable form representing the determined physical delivery address.

22. The method of claim 19, wherein the received item has a second mail designation corresponding to a sender of the item printed on the exterior surface and wherein the second mail designation is stored in one of the plurality of records and excludes a name corresponding to the sender.

23. The method of claim 19, further comprising receiving a request from one of the recipients to modify the delivery records and responding to the request by providing the requesting recipient with access to one of the delivery records corresponding to the delivery designation of the requesting recipient, wherein the provided access comprises modifying the physical delivery address in the accessed delivery record.

24. The method of claim 19, wherein the mail code comprises an address on a digital data network and wherein the method further comprises transmitting prior to the delivering a message indicating the delivering is to be performed for the physical item.

25. A method of maintaining a database of delivery records for recipients of physical items including letters and parcels, comprising:

providing a database comprising delivery records corresponding to a plurality of the recipients, wherein the delivery records each comprise fields for storing a mail designations password, and address information;

receiving from each of the recipients a human readable alphanumeric code representing their mail designation and their password and a set of addressing data comprising their current physical delivery address;

updating the delivery records in the database corresponding to the recipients by storing the human readable alphanumeric codes in the mail designation and password fields and the addressing data in the address information fields; and linking the database to a digital data network to provide access to the delivery records in the database to a delivery service based on an input mail designation, wherein the input mail designation is utilized to retrieve the password corresponding to one of the received mail designations matching the input mail designation.

26. The method of claim 25, wherein the human readable alphanumeric code does not include names of the recipients.

27. The method of claim 25, further comprising providing the recipients access to the delivery records via the digital data network, wherein the provided access comprises viewing the stored address information.

28. The method of claim 27, wherein the provided access further comprises allowing each of the recipients to modify the stored address information.

29. The method of claim 28, wherein the stored address information further comprises a set of delivery instructions and wherein the provided access further comprises allowing each of the recipients to modify the set of delivery instructions in the stored address information.

30. A method for delivering physical items to recipients at physical addresses, comprising:

providing a plurality of delivery records in memory corresponding to the recipients, each of the delivery records comprising a mail designation, a password, and a physical delivery address;

receiving an item for delivery having one of the mail designations and a password printed on an exterior surface;

using the mail designation on the received item to access the delivery records to identify the record associated with one of the recipients, to determine whether the received password matches the password in the record associated with the one recipient, and to determine one of the physical delivery addresses associated with the mail designation for the one recipient;

marking the received item with an indicator of the determined physical delivery address; and delivering the received item based on the indicator.

31. The method of claim 30, wherein the providing comprises receiving from the recipients the mail designations and the passwords to be stored in the delivery records, whereby the recipients are able to select the mail designations and the passwords.

32. The method of claim 30, further comprising prior to the delivering, when the received password is missing or does not match the password in the associated record, diverting the received item for additional processing.

33. The method of claim 32, wherein the additional processing comprises inspection of the received item, transmitting an inquiry to the one recipient, transmitting an inquiry to a sender of the received item, or returning the received item to the sender.

34. The method of claim 33, wherein the plurality of delivery records comprises a record for the sender, the received item comprises a mail designation and a password corresponding to the sender printed on the exterior surface, and the returning of the received item to the sender comprises accessing the plurality of delivery records to verify that the sender password matches a password in a record in the delivery records corresponding to the sender.

* * * * *